United States Patent
Huang et al.

(10) Patent No.: US 12,107,784 B2
(45) Date of Patent: Oct. 1, 2024

(54) COMMUNICATION APPARATUS AND COMMUNICATION METHOD FOR INITIAL ACCESS

(71) Applicant: Panasonic Intellectual Property Corporation of America, Torrance, CA (US)

(72) Inventors: Lei Huang, Singapore (SG); Akihiko Nishio, Osaka (JP); Tien Ming (Benjamin) Koh, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 506 days.

(21) Appl. No.: 17/434,243

(22) PCT Filed: Nov. 27, 2019

(86) PCT No.: PCT/SG2019/050582
§ 371 (c)(1),
(2) Date: Aug. 26, 2021

(87) PCT Pub. No.: WO2020/176035
PCT Pub. Date: Sep. 3, 2020

(65) Prior Publication Data
US 2022/0150013 A1    May 12, 2022

(30) Foreign Application Priority Data
Feb. 28, 2019 (SG) .............. 10201901838S

(51) Int. Cl.
H04W 4/00       (2018.01)
H04L 5/00       (2006.01)
H04W 72/0446    (2023.01)

(52) U.S. Cl.
CPC .......... H04L 5/0048 (2013.01); H04L 5/0092 (2013.01); H04W 72/0446 (2013.01)

(58) Field of Classification Search
CPC ............... H04L 5/0448; H04L 5/0092; H04W 72/0446; H04W 72/04
(Continued)

(56) References Cited

U.S. PATENT DOCUMENTS 11,582,077 B2 *  2/2023  Salem ............... H04W 74/0808
11,706,074 B2 *  7/2023  Sun .................. H04W 74/0808
                                                        370/336

(Continued)

FOREIGN PATENT DOCUMENTS

JP         2017535198 A      11/2017

OTHER PUBLICATIONS

Qualcomm Incorporated, "DL signals and channels for NR-U," R1-1900871, Agenda Item: 7.2.2.1.2, 3GPP TSG RAN WG1 Meeting AH-1901, Taipei, Taiwan, Jan. 21-25, 2019, 9 pages.

(Continued)

*Primary Examiner* — Marceau Milord
(74) *Attorney, Agent, or Firm* — Seed IP Law Group LLP

(57) ABSTRACT

A terminal includes a receiver, which in operation, receives one or more discovery reference signal (DRS) transmitted by a base station within a channel occupancy time (COT) starting at a possible starting position that is not aligned with half a slot boundary. The terminal includes circuitry, which in operation, determines frame timing in response to receiving the one or more DRS.

14 Claims, 19 Drawing Sheets

(58) Field of Classification Search
USPC .......................................................... 370/336
See application file for complete search history.

(56) References Cited

U.S. PATENT DOCUMENTS

| | | | |
|---|---|---|---|
| 11,751,251 B2* | 9/2023 | Li ..................... | H04W 74/0808 |
| | | | 370/329 |
| 2016/0127098 A1 | 5/2016 | Ng et al. | |
| 2019/0037509 A1* | 1/2019 | Li ....................... | H04W 56/001 |
| 2020/0092876 A1* | 3/2020 | Cho ....................... | H04W 72/21 |
| 2020/0196306 A1* | 6/2020 | Si .......................... | H04W 16/14 |
| 2021/0135803 A1* | 5/2021 | Chang ............... | H04W 74/0808 |
| 2021/0297204 A1* | 9/2021 | Davydov ............ | H04L 27/2605 |
| 2022/0060905 A1* | 2/2022 | Niu ................... | H04W 72/0453 |

OTHER PUBLICATIONS

Fujitsu, "Initial Slot with Flexible Starting Positions for NR-U," R1-1900243, Agenda Item: 7.2.2.1.2, 3GPP TSG RAN WG1 Ad-Hoc Meeting #1901, Taipei, Taiwan, Jan. 21-25, 2019, 4 pages.
International Search Report dated Jan. 23, 2020, for the corresponding International Patent Application No. PCT/SG2019/050582, 3 pages.

* cited by examiner

COMMUNICATION APPARATUS AND COMMUNICATION METHOD FOR INITIAL ACCESS

BACKGROUND

1. Technical Field

The present disclosure generally relates to a communication apparatus and communication method for initial access, and more particularly relates to establishing the initial access of electronic devices in radio access technology.

2. Description of Related Art

In the standardization of 5G, a new radio access technology (NR: New Radio) not necessarily having backward compatibility with LTE (Long Term Evolution)/LTE-Advanced has been discussed in the 3GPP (3rd generation partnership project).

In NR, as with LTE-LAA (License-Assisted Access), an operation in unlicensed bands is expected. In addition, in order to implement NR stand-alone (operable by NR alone) in unlicensed bands, introducing the initial access procedure, which has not been introduced into LTE-LAA, into unlicensed bands will be advantageous.

SUMMARY

One non-limiting and exemplary embodiment facilitates initial access of electronic devices into unlicensed bands in radio access technology (RAT).

In one example embodiment, a technique disclosed here features a terminal that establishes initial access. The terminal comprises a receiver, which in operation, receives one or more discovery reference signal (DRS) transmitted by a base station within a channel occupancy time (COT) starting at a possible starting position that is not aligned with half a slot boundary; and circuitry, which in operation, determines frame timing in response to receiving the one or more DRS.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Skilled artisans will appreciate that elements in the figures are illustrated for simplicity and clarity and have not necessarily been depicted to scale.

DETAILED DESCRIPTION

In 5G NR unlicensed (NR-U) operation, an initial access procedure at least can be split into the following three steps: a first step is cell search which is the procedure for user equipment (UE) to acquire time and frequency synchronization with a cell and to detect the physical layer cell identity (ID) of the cell. NR cell search is based on synchronization signal blocks (SSBs) located on the synchronization raster. A SSB comprises a primary synchronization signal, a secondary synchronization signal, a physical broadcast channel (PBCH) and a demodulation reference signal (DMRS) for demodulating the PBCH. A second step is reception of minimum system information that includes essential cell configuration parameters. A third step is random access.

One or more discovery reference signal (DRS) is periodically transmitted by the base station (gNodeB or gNB) to assist UEs in the cell search and the reception of minimum system information. A DRS is transmitted within half a slot and includes at least a SSB, a control resource set (CORESET) for remaining minimum system information (RMSI) associated with the SSB, and a physical downlink shared channel (PDSCH) carrying the RMSI.

In multi-beam operation, more than one DRS is transmitted in different beams consecutively within a DRS transmission window. The DRS transmission window is especially configured by the base station to accommodate DRS transmission. One or more parameters associated with the DRS transmission window are determined by the base station and informed to the UEs via a DRS measurement timing configuration (DMTC).

In some instances, a LBT (listen before talk) mechanism is implemented for NR channel access in unlicensed bands, depending on the country, frequency, and conditions.

One problem is that DRS transmission opportunities may be reduced due to LBT failure.

Example embodiments solve this and other technical problems that occur with providing UEs initial access in radio access networks. Solutions include, but are not limited to, providing a DRS transmission window with multiple possible starting positions per half a slot.

Example embodiments include apparatus and methods that provide UEs initial access in wireless networks, such as 5G NR stand-alone networks operating in unlicensed band or other networks. For example, a terminal comprises a receiver, which in operation, receives one or more discovery reference signal (DRS) transmitted by a base station within a channel occupancy time (COT) starting at a possible starting position that is not aligned with half a slot boundary; and circuitry, which in operation, determines frame timing in response to receiving the one or more DRS.

Figure 1A:
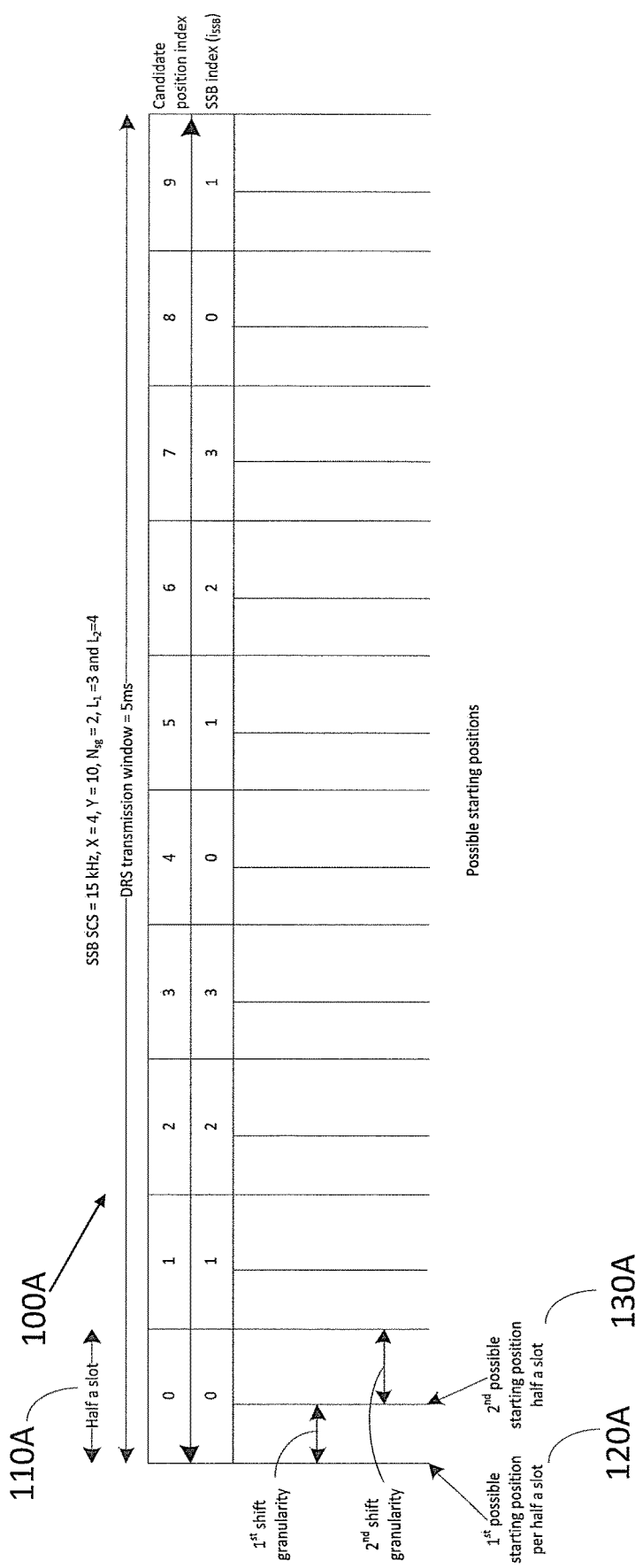
FIGS. 1A and 1B show how possible starting positions are configured for DRS transmission in accordance with an example embodiment.
Figure 1B:
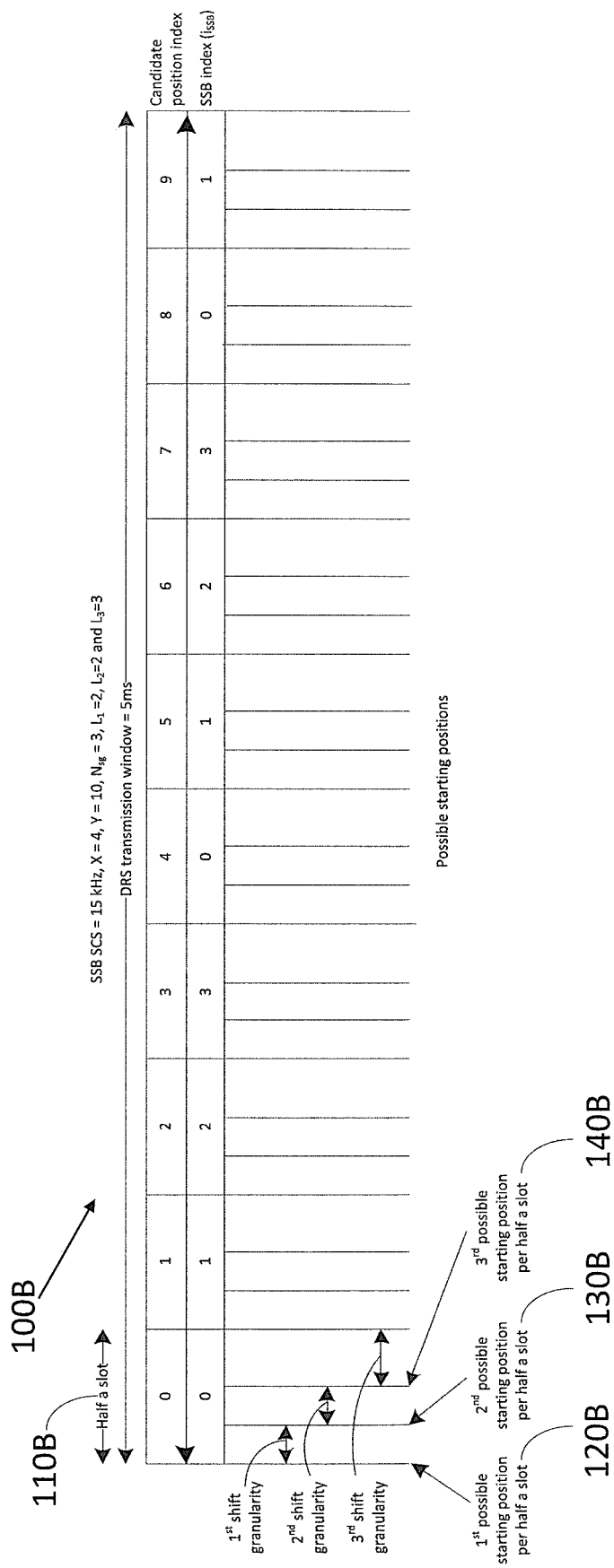

FIGS. 1A-1B show how possible starting positions are configured for DRS transmission in accordance with an example embodiment. A plurality of possible starting positions are shown at 100A and 100B. Half a slots 110A and 110B are shown along the candidate SSB position index.

As shown in FIG. 1A, the DRS transmission window has a duration of 5 ms, SSB subcarrier spacing (SCS)=15 kHz, X=4 (with X being the maximum number of transmitted SSBs within a DRS transmission window), Y=10 (with Y being the maximum number of candidate SSB positions within a DRS transmission window), $N_{sg}$=2 (with $N_{sg}$ being the number of shift granularities per half a slot or possible starting positions per half a slot), $L_1$=3, and $L_2$=4 (with an i-th shift granularity having a duration of $L_i$ OFDM symbols). The half a slot 110A includes a first shift granularity and a second shift granularity. The half a slot also includes a first possible starting position 120A and a second possible starting position 130A.

SCS used for SSB transmission is not fixed but can scale according to $2^{\mu}\times15$ kHz (e.g., the SCSs of 15 and 30 kHz corresponding to $\mu$=0 and 1, respectively). Further, as the numerology $\mu$ increases, a number of slots in a subframe increases such that slot length scales according to the SCS (slot length=$½^{\mu}$ ms). For example, each frame is 10 ms, and each subframe is 1 ms with 10 subframes per frame and 14 orthogonal frequency division multiplexing (OFDM) symbols per slot (i.e. 7 OFDM symbols per half a slot). Each subframe can be divided in to multiple OFDM symbols depending on the selected numerology $\mu$. For SCS=15 kHz (i.e. $\mu$=0), a subframe contains a slot and thus half a slot has a duration of 0.5 ms. For SCS=30 kHz (i.e. $\mu$=1), a subframe contains two slots and thus half a slot has a duration of 0.25 ms. Further, each OFDM symbol in a slot can be uplink (U), downlink (D), or flexible (X).

As shown in FIG. 1B, the DRS transmission window has a duration of 5 ms, SSB SCS=15 kHz, X=4, Y=10, $N_{sg}$=3, $L_1$=2, $L_2$=2, and $L_3$=3. The figure shows the half a slot 110B with a first shift granularity, a second shift granularity, and a third shift granularity. The half a slot includes a first possible starting position 120B, a second possible starting position 130B, and a third possible starting position 140B.

As shown in FIGS. 1A and 1B, more than one shift granularities may be configured per half a slot. As such, multiple possible starting positions may be configured per half a slot within a DRS transmission window.

As shown in FIGS. 1A and 1B, the i-th shift granularity ($1 \leq i \leq N_{sg}$) has a duration of $L_i$ symbols subject to the following:

$\Sigma_{i=1}^{N_{sg}} L_i = 7$, where $N_{sg}$ is the number of shift granularities configured per half a slot.

For FIG. 1A, $N_{sg}$=2, $L_1$=3 and $L_2$=4. For FIG. 1B, $N_{sg}$=3, $L_1$=2, $L_2$=2, and $L_3$=3. The number of possible starting positions per half a slot is equal to $N_{sg}$. These configurations have the effect of improving the transmission opportunities of SSBs.

In an example embodiment, for a SSB SCS, the possible starting positions per half a slot are established or decided in advance (e.g., programmed and stored in memory). Further, the number of possible starting positions per half a slot may vary for different SSB SCSs. For example, the number of possible starting positions per half a slot for a smaller SSB SCS (e.g. 15 kHz) may be greater than that for a larger SSB SCS (e.g. 30 kHz). This has the effect of providing similar transmission opportunities of SSBs for both the SSB SCSs.

FIGS. 1C-1F show a DRS transmission in accordance with a first example embodiment.

Figure 1C:
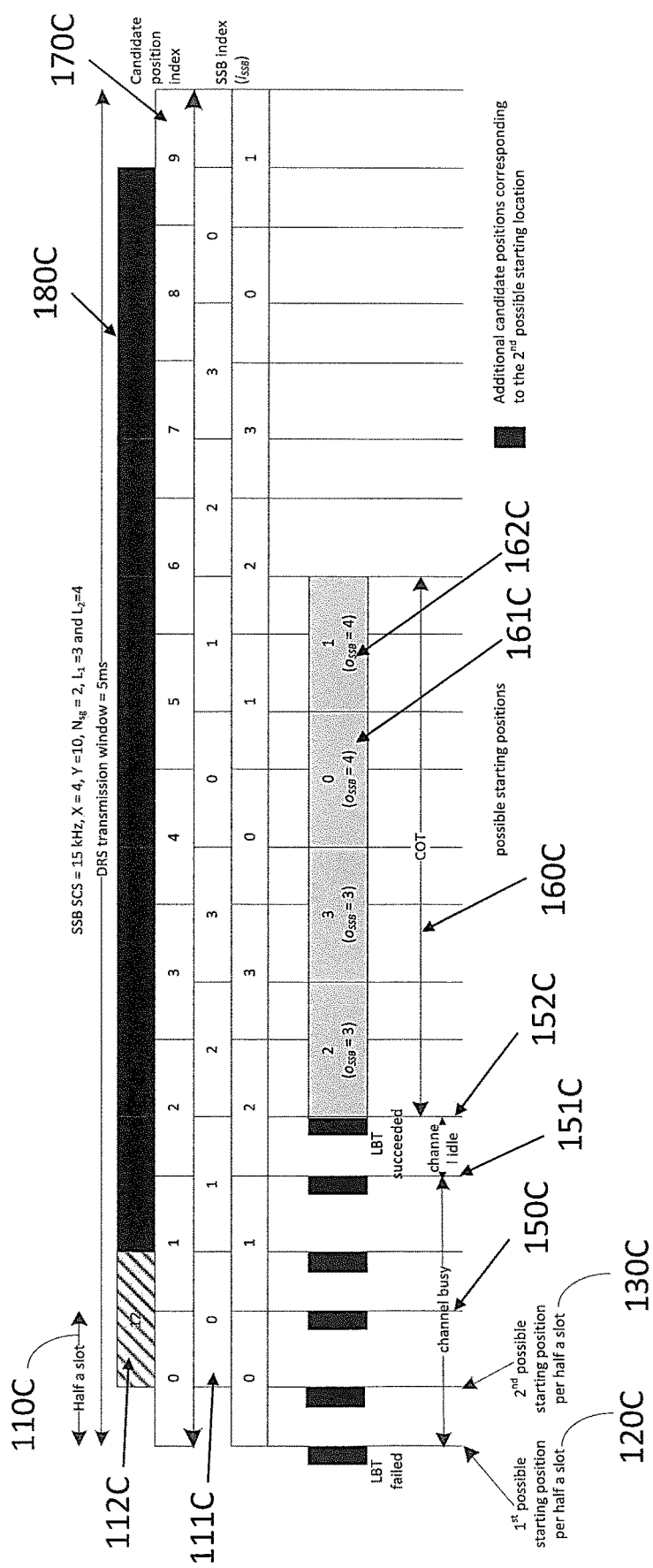
FIGS. 1C-1F show a DRS transmission in accordance with a first example embodiment.

As shown in FIG. 1C, the DRS transmission window has a duration of 5 ms, SSB SCS=15 kHz, X=4, Y=10, $N_{sg}$=2, $L_1$=3, and $L_2$=4. The figure shows the half a slot 110C with a first possible starting position 120C and a second possible starting position 130C. LBT failed and the channel was busy as shown at 150C. A channel occupancy time (COT) obtained by a base station and starting at a possible starting position which is not aligned with half a slot boundary is shown at 160C. A set of Y candidate positions 170C with the candidate position indexes of 0 to 9 correspond to first possible starting positions. A set of Y-1 additional candidate positions 180C with the candidate position indexes of 12 to 20 correspond to second possible starting positions. Since the additional candidate positions are corresponding to the second possible starting positions and cannot be outside the DRS transmission window, the number of additional candidate positions is Y-1. The indexes of the additional candidate positions and the indexes of the candidate positions may not be consecutive.

A COT is the time during which a base station or a terminal may transmit on a given channel without re-evaluating the availability of the channel.

According to the first example embodiment, if the COT starts at a possible starting position that is aligned with half a slot boundary (e.g., 151C), the time-domain positions of the actually transmitted SSBs are selected from the set of Y candidate positions. If the COT starts at a possible starting position that is not aligned with half a slot boundary (e.g., 152C), the time-domain positions of the actually transmitted SSBs are selected from the set of Y-1 additional candidate positions corresponding to the possible starting position.

According to a conventional mechanism, the SSBs (e.g. 161C and 162C) dropped due to LBT failure are cyclically wrapped around to the end of the SSB burst set transmission.

According to a conventional mechanism, either the SSB index $i_{SSB}$ or the candidate position index i is indicated to UEs in the corresponding SSB for help UEs' determination of frame timing. If the SSB index $i_{SSB}$ is indicated to UEs in the corresponding SSB, the timing offset $o_{SSB}=\lfloor i/X \rfloor$ also need to be indicated to the UEs in the corresponding SSB for help UEs' determination of frame timing.

According to a conventional mechanism, the mapping between candidate SSB position index i to the SSB index $i_{SSB}$ is given by $i_{SSB}$=i mod X. SSBs with the same $i_{SSB}$ are assumed to be transmitted with the same beam. That is, antenna ports used for transmitting SSBs with the same $i_{SSB}$ are assumed to be quasi-co-located (QCLed). Two antenna ports are QCLed when properties of the channel over which a symbol on one antenna port is conveyed can be inferred from the channel over which a symbol on the other antenna port is conveyed.

According to the first example embodiment, the starting index for the additional candidate positions is set to an integer multiple of X. As a result, the SSB index $i_{SSB}$ for the starting additional candidate position is 0, which is the same as that for the starting candidate position. Referring to FIG. 1C, the starting index for the additional candidate positions is 12 (multiple of X) as represented by 112C and the SSB index $i_{SSB}$ for the starting additional candidate position is 0 as represented as 111C.

In the example of FIG. 1C, X=4, Y=10, and both the SSB index $i_{SSB}$ and the timing offset $o_{SSB}$ are indicated to UEs in the corresponding SSB for help UEs' determination of frame timing. As mentioned in the above, the timing offset $o_{SSB}$ is represented by $\lfloor i/X \rfloor$ and thus the timing offset $o_{SSB}$ can be 0, 1 or 2 for the set of Y candidate positions and can be 3, 4 or 5 for the set of Y-1 additional candidate positions. In the example of FIG. 1C, the number of bits required for the timing offset $o_{SSB}$ is increased from 2 to 3 due to the introduction of additional candidate positions.

FIG. 1C shows a SSB with $i_{SSB}$=2 and $O_{SSB}$=3 is transmitted at an additional candidate position with the candidate position index of 14, a SSB with $i_{SSB}$=3 and $O_{SSB}$=3 is transmitted at an additional candidate position with the candidate position index of 15, a SSB with $i_{SSB}$=0 and $O_{SSB}$=4 is transmitted at an additional candidate position with the candidate position index of 16, and a SSB with $i_{SSB}$=1 and $O_{SSB}$=4 is transmitted at an additional candidate position with the candidate position index of 17.

In the example of FIG. 1C, if a detected SSB has the $o_{SSB}$ value larger than 2, then UEs know the SSB is transmitted from an additional candidate position and then can properly determine the frame timing based on the values of the SSB index $i_{SSB}$ and the timing offset $o_{SSB}$ of the detected SSB.

Figure 1D:
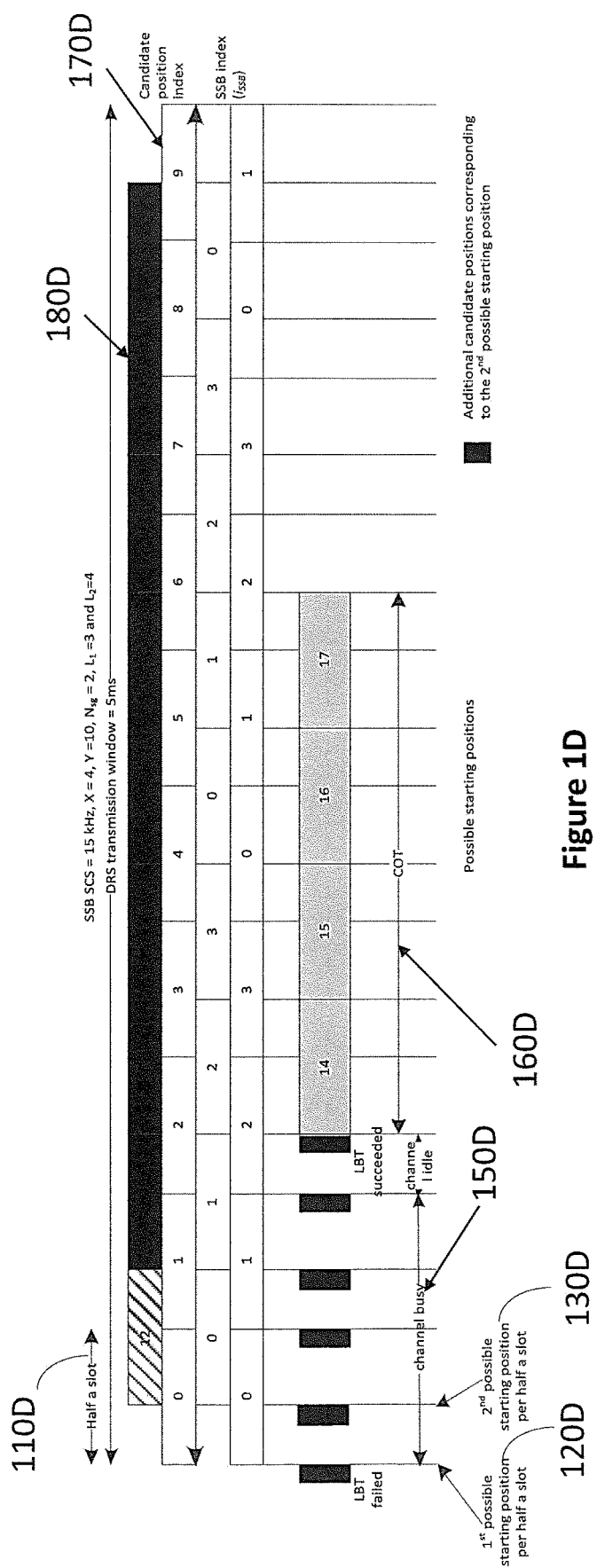

As shown in FIG. 1D, the DRS transmission window has a duration of 5 ms, SSB SCS=15 kHz, X=4, Y=10, $N_{sg}$=2, $L_1$=3, and $L_2$=4. The figure shows the half a slot 110D with a first possible starting position 120D and a second possible starting position 130D. LBT failed and the channel was busy as shown at 150D. A COT obtained by a base station and starting at a possible starting position which is not aligned with half a slot boundary is shown at 160D. A set of Y candidate positions 170D with the candidate position indexes of 0 to 9 correspond to first possible starting positions. A set of Y-1 additional candidate positions 180D with the candidate position indexes of 12 to 20 correspond to second possible starting positions.

In the example of FIG. 1D, the candidate position index i is indicated to UEs in the corresponding SSB for help UEs' determination of frame timing. The number of bits required for the candidate position index i is increased from 4 to 5 due to the introduction of the additional candidate positions.

FIG. 1D shows a SSB with i=14 is transmitted at an additional candidate position with the candidate position index of 14, a SSB with i=15 is transmitted at an additional candidate position with the candidate position index of 15, a SSB with i=16 is transmitted at an additional candidate position with the candidate position index of 16, and a SSB with i=17 is transmitted at an additional candidate position with the candidate position index of 17.

In this example of FIG. 1D, Y=10 and thus the candidate position index i is up to 9 for the candidate positions. If a detected SSB has the candidate position index i of 12 to 20, then UEs know the SSB is transmitted from an additional candidate position and then can properly determine the frame timing based on the candidate position index of the detected SSB.

Figure 1E:
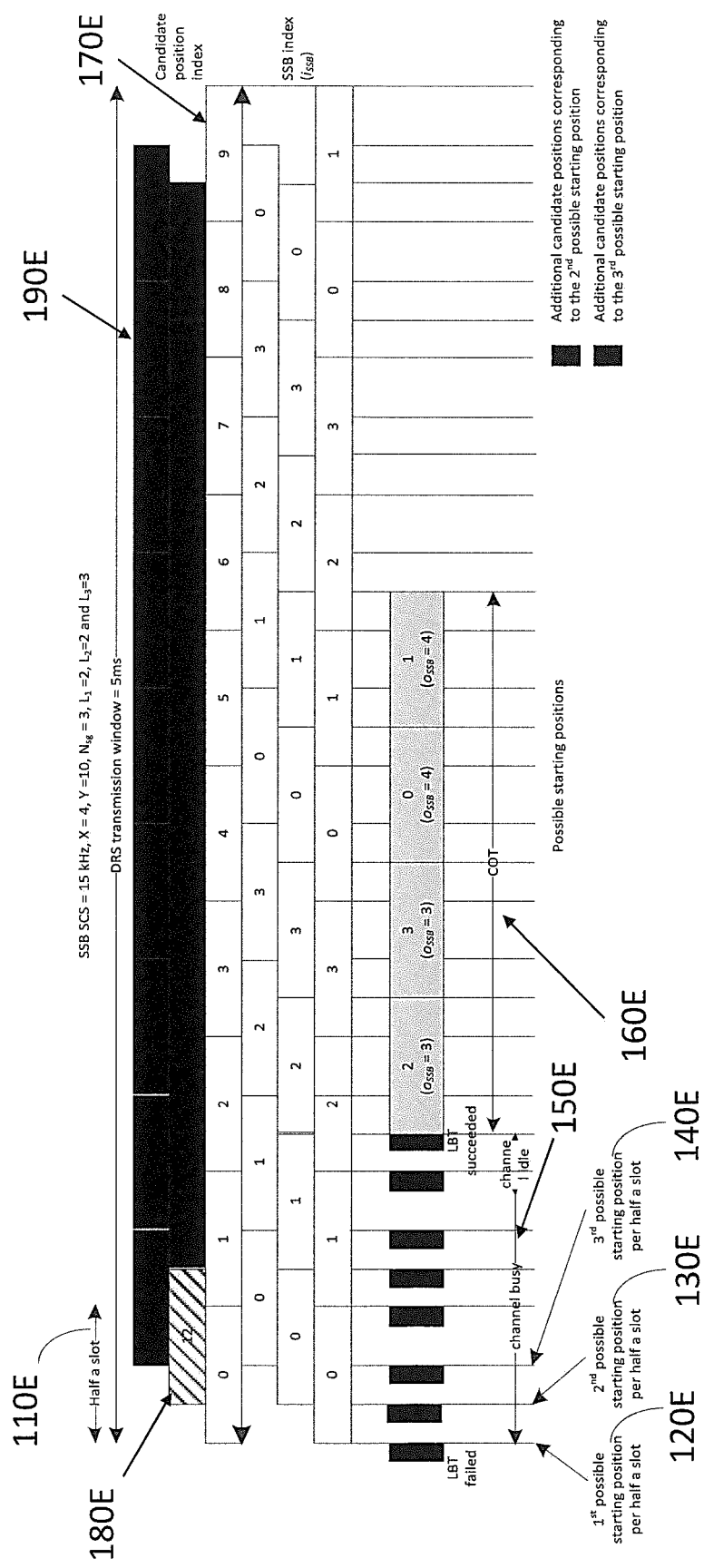

As shown in FIG. 1E, the DRS transmission window has a duration of 5 ms, SSB SCS=15 kHz, X=4, Y=10, $N_{sg}$=3, $L_1$=2, $L_2$=2, and $L_3$=3. The figure shows the half a slot 110E with a first possible starting position 120E, a second possible starting position 130E, and a third possible starting position 140E. LBT failed and the channel was busy as shown at 150E. A COT obtained by a base station and starting at a possible starting position which is not aligned with half a slot boundary is shown at 160E. A set of Y candidate positions 170E with the candidate position indexes of 0 to 9 correspond to first possible starting positions. A set of Y-1 additional candidate positions 180E with the candidate position indexes of 12 to 20 correspond to second possible starting positions. A set of Y-1 additional candidate positions 190E with the candidate position indexes of 24 to 32 correspond to third possible starting positions.

In the example of FIG. 1E, X=4, Y=10, and both the SSB index $i_{SSB}$ and the timing offset $o_{SSB}$ are indicated to UEs in the corresponding SSB for help UEs' determination of frame timing. As mentioned in the above, the timing offset $o_{SSB}$ is represented by $\lfloor i/X \rfloor$ and thus the timing offset $o_{SSB}$ can be 0, 1 or 2 for the set of Y candidate positions, and can be 3, 4 or 5 for the set of Y-1 additional candidate positions corresponding to the second possible starting positions, and can be 6, 7 or 8 for the set of Y-1 additional candidate positions corresponding to the third possible starting positions.

In the example of FIG. 1E, if a detected SSB has the $o_{SSB}$ value of 3 to 5, then UEs know the SSB is transmitted from an additional candidate position corresponding to the second possible starting positions. If a detected SSB has the $o_{SSB}$ value of 6 to 8, then UEs know the SSB is transmitted from an additional candidate position corresponding to the third possible starting positions. So the UEs can properly determine the frame timing based on the values of the SSB index $i_{SSB}$ and the timing offset $o_{SSB}$ of the detected SSB.

Figure 1F:
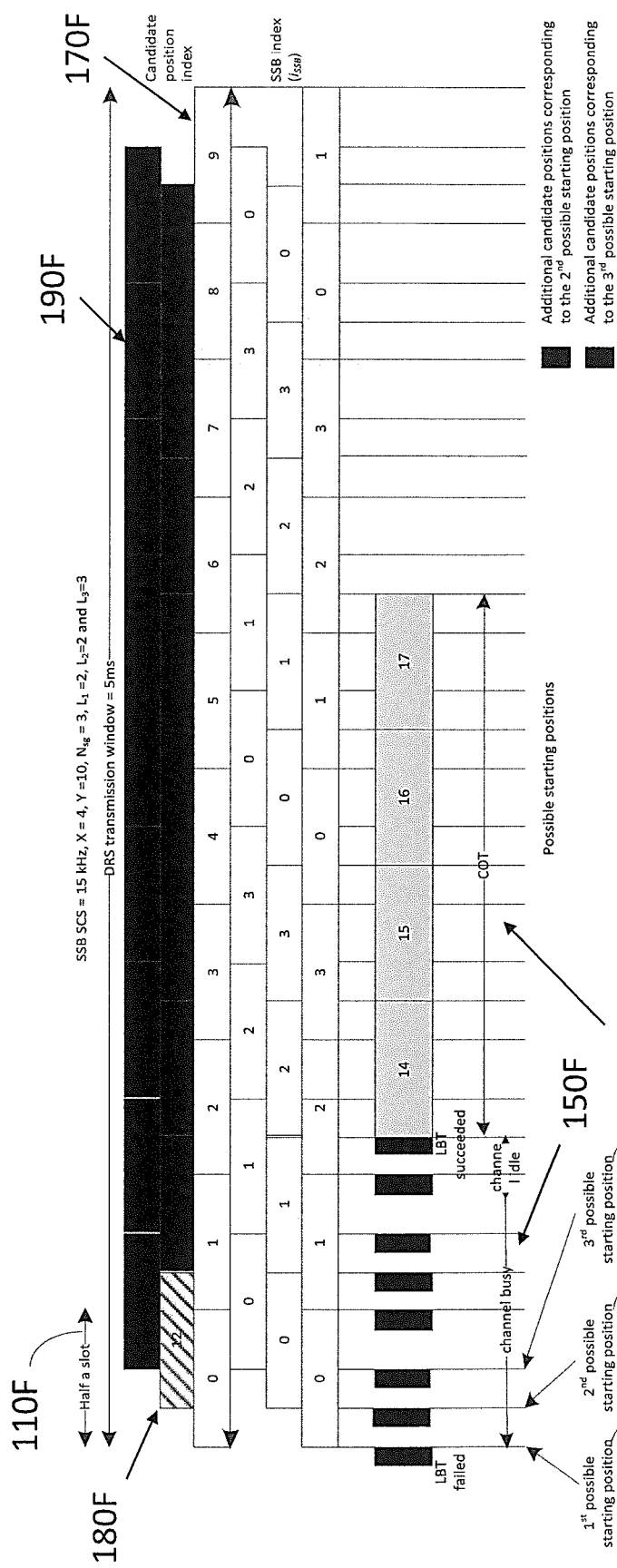

As shown in FIG. 1F, the DRS transmission window has a duration of 5 ms, SSB SCS=15 kHz, X=4, Y=10, $N_{sg}$=3, $L_1$=2, $L_2$=2, and $L_3$=3. The figure shows the half a slot 110F with a first possible starting position 120F, a second possible starting position 130F, and a third possible starting position 140F. LBT failed and the channel was busy as shown at 150F. A COT obtained by a base station and starting at a possible starting position which is not aligned with half a slot boundary is shown at 160F. A set of Y candidate positions 170F with the candidate position indexes of 0 to 9 correspond to first possible starting positions. A set of Y-1 additional candidate positions 180F with the candidate position indexes of 12 to 20 correspond to second possible starting positions. A set of Y-1 additional candidate positions 190F with the candidate position indexes of 24 to 32 correspond to third possible starting positions.

In the example of FIG. 1F, the candidate position index i is indicated to UEs in the corresponding SSB for help UEs' determination of frame timing. Compared with the example of FIG. 1D, the number of bits required for the candidate position index i is further increased to 6 due to the introduction of the additional candidate SSB positions corresponding to the third possible starting positions.

In this example of FIG. 1F, Y=10 and thus the candidate position index i is up to 9 for normal candidate positions. If a detected SSB has the candidate position index i of 12 to 20, then UEs know the SSB is transmitted from an additional candidate position corresponding to the second possible starting position. If a detected SSB has the candidate position index i of 24 to 32, then UEs know the SSB is transmitted from an additional candidate position corresponding to the third possible starting position. So the UEs can properly determine the frame timing based on the candidate position index value of the detected SSB.

According to the first example embodiment (e.g. as shown in FIGS. 1C-1F), a COT obtained by a base station may start from a possible starting position that is not aligned with half a slot boundary. One or more DRS is transmitted from the beginning of a COT obtained by a base station, regardless of whether the COT is aligned with half a slot boundary.

According to the first example embodiment, if the COT starts at a possible starting position that is aligned with half a slot boundary, the time-domain positions of the actually transmitted SSBs are selected from a set of Y candidate positions.

If the COT starts at a possible starting position that is not aligned with half a slot boundary (e.g., as shown in FIG. 1C-1F), the time domain positions of the actually transmitted SSBs are selected from a set of Y-1 additional candidate positions corresponding to the possible starting position. The starting index for the set of Y-1 additional candidate SSB positions is an integer multiple of X.

These examples as illustrated in FIG. 1C-1F show an advantage in that the conventional mechanism for determining frame timing can be reused with the introduction of additional candidate positions.

Figure 2:
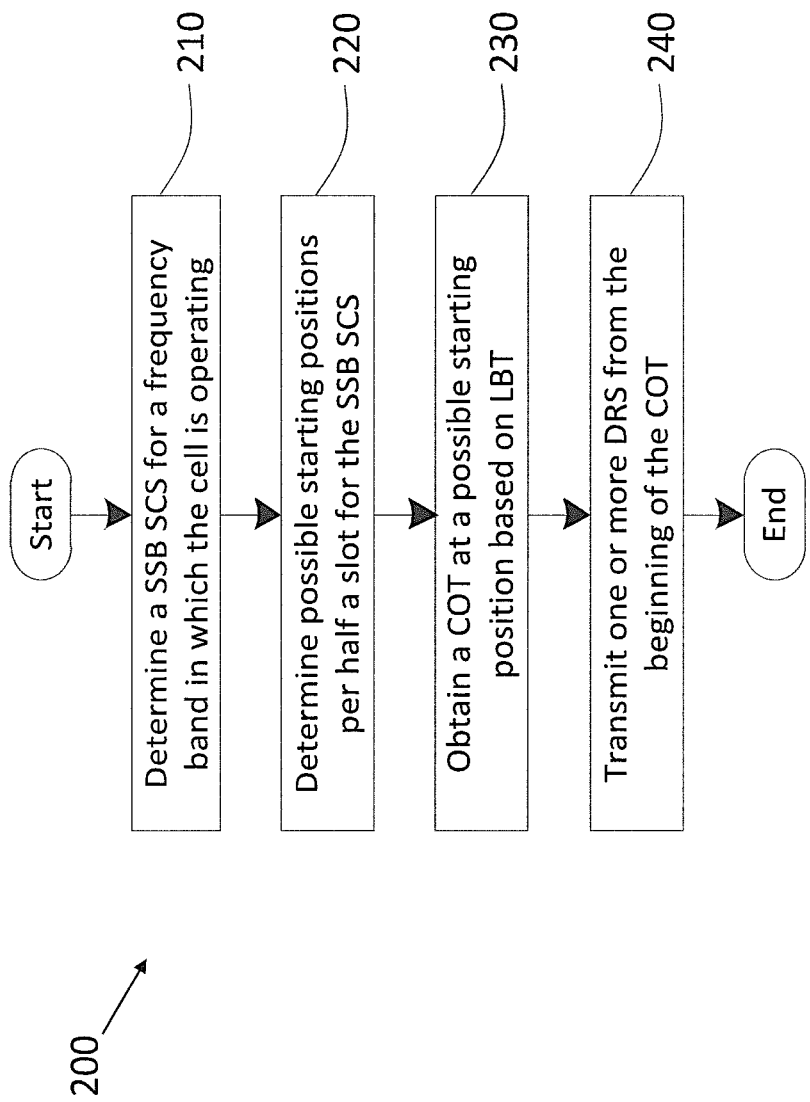
FIG. 2 shows a method of DRS transmission from a base station in accordance with the first example embodiment.

FIG. 2 shows a method 200 of DRS transmission from a base station according to the first example embodiment. At step 210 the base station determines a SSB SCS for a frequency band in which the cell is operating. At step 220 the base station determines possible starting positions per half a slot within a DRS transmission window for the SSB SCS. At step 230 the base station obtains a COT at a possible starting position based on LBT outcome, which may not be aligned with half a slot boundary. At step 240 the base station transmits one or more DRSs from the beginning of the COT regardless of whether the COT is aligned with half a slot boundary.

Figure 3:
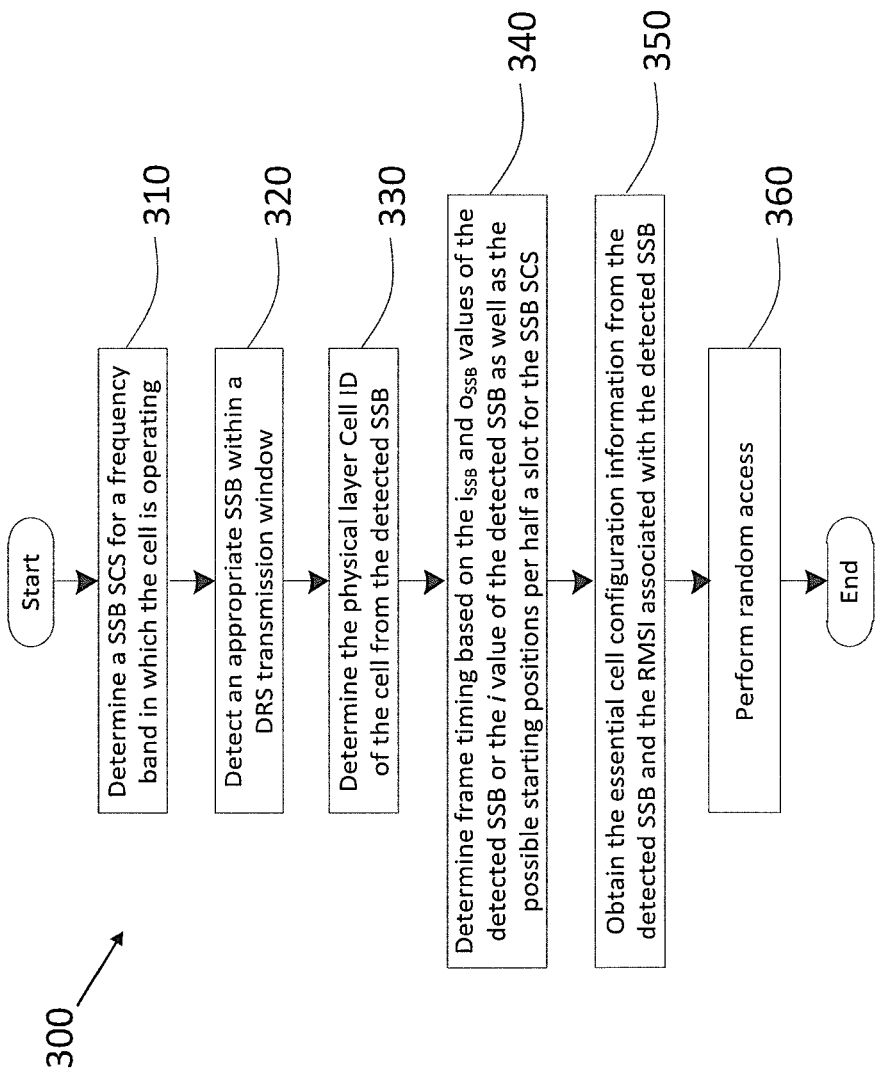
FIG. 3 shows a method of performing an initial access procedure by a terminal in accordance with the first example embodiment.

FIG. 3 shows a method 300 of performing an initial access procedure by a terminal. At step 310 the terminal determines a SSB SCS for a frequency band in which the cell is operating. At step 320 the terminal detects an appropriate SSB within a DRS transmission window. At step 330 the terminal determines the physical layer cell ID of the cell from the detected SSB. At step 340 the terminal determines frame timing based on the values of the SSB index ($i_{SSB}$) and the timing offset ($O_{SSB}$) of the detected SSB or the value of the candidate position index (i) of the detected SSB as well as the possible starting positions per half a slot for the SSB SCS. At step 350 the terminal obtains the essential cell configuration information from the detected SSB and the remaining minimum system information (RMSI) associated with the detected SSB. At step 360, the terminal initiates a random access procedure with the base station.

Figure 4A:
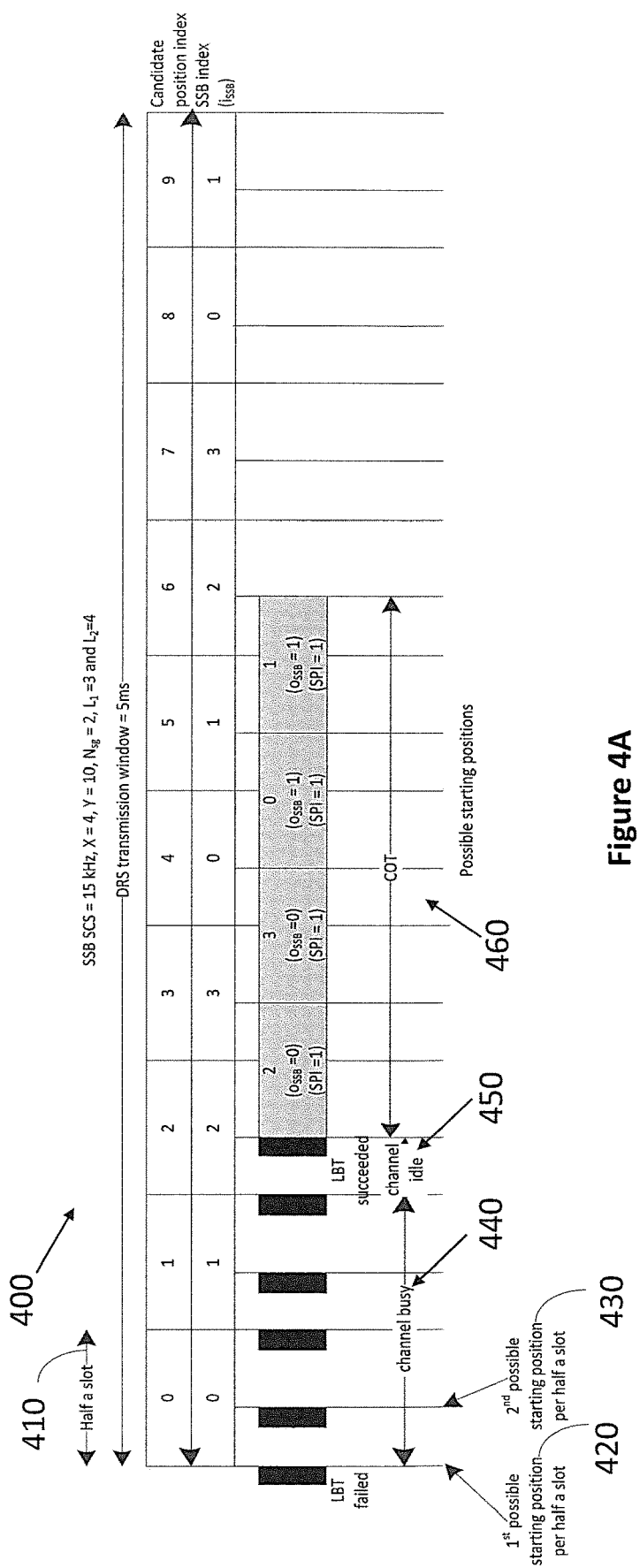
FIGS. 4A and 4B show a DRS transmission in accordance with a second example embodiment.
Figure 4B:
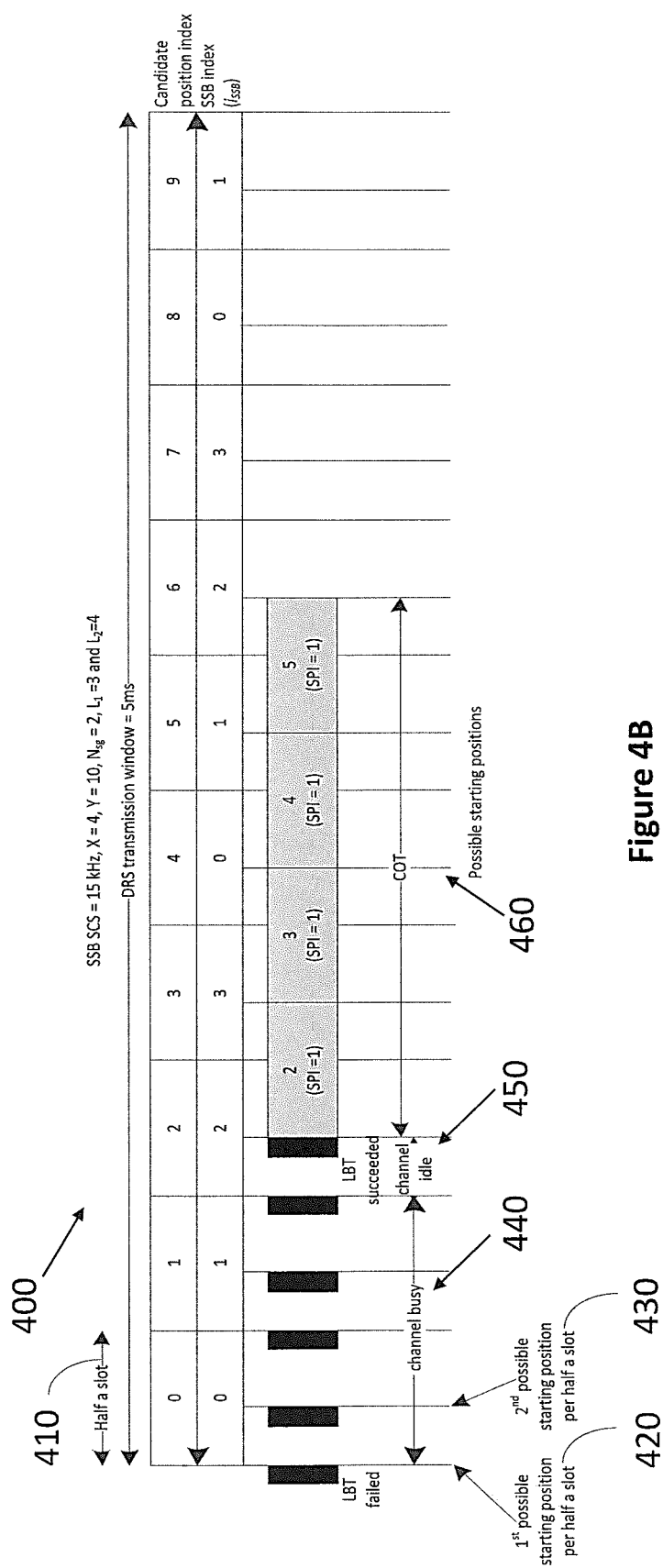

FIGS. 4A and 4B show a DRS transmission 400 in accordance with a second example embodiment. The DRS transmission 400 shows a plurality of possibly starting positions. Half a slots are shown along the candidate position index. In the examples of FIGS. 4A and 4B, DRS transmission window has a duration of 5 ms, SSB SCS=15 kHz, X=4, Y=10, $N_{sg}$=2, $L_1$=3, and $L_2$=4. The figure shows the half a slot 410 with a first possible starting position 420 and a second possible starting position 430. The channel was busy at 440. LBT succeeded and the channel was idle at 450, and a COT obtained by a base station and starting a possible starting position which is not aligned with half a slot boundary is shown at 460.

In the example of FIG. 4A, in addition to the SSB index $i_{SSB}$ and the timing offset $o_{SSB}$, an extra signaling (e.g. starting position index (SPI)) is indicated to UEs in the corresponding SSB to aid the UEs in determining frame timing. The SPI is set to 0 to indicate the COT starts at the first possible starting position 420, set to 1 to indicate the COT starts at the second possible starting position 430, and so on. The UEs can properly determine the frame timing based on the values of the SSB index $i_{SSB}$, the timing offset $o_{SSB}$ and the SPI of a detected SSB.

The SPI may be combined with other signaling (e.g., the timing offset $O_{SSB}$) to reduce the bit width. For example, assume five possible starting positions and $O_{SSB}$=0, 1 or 2. For separate signaling, three bits are used to indicate SPI and two bits are used to indicate $O_{SSB}$. For combined signaling, only four bits are used to jointly indicate SPI and $O_{SSB}$.

In the example of FIG. 4B, in addition to the candidate SSB position index i, an extra signaling (e.g. SPI) is indicated to UEs in the corresponding SSB to aid the UEs in determining frame timing. The UEs can properly determine the frame timing based on the candidate position index value and the SPI value of a detected SSB.

Figure 5:
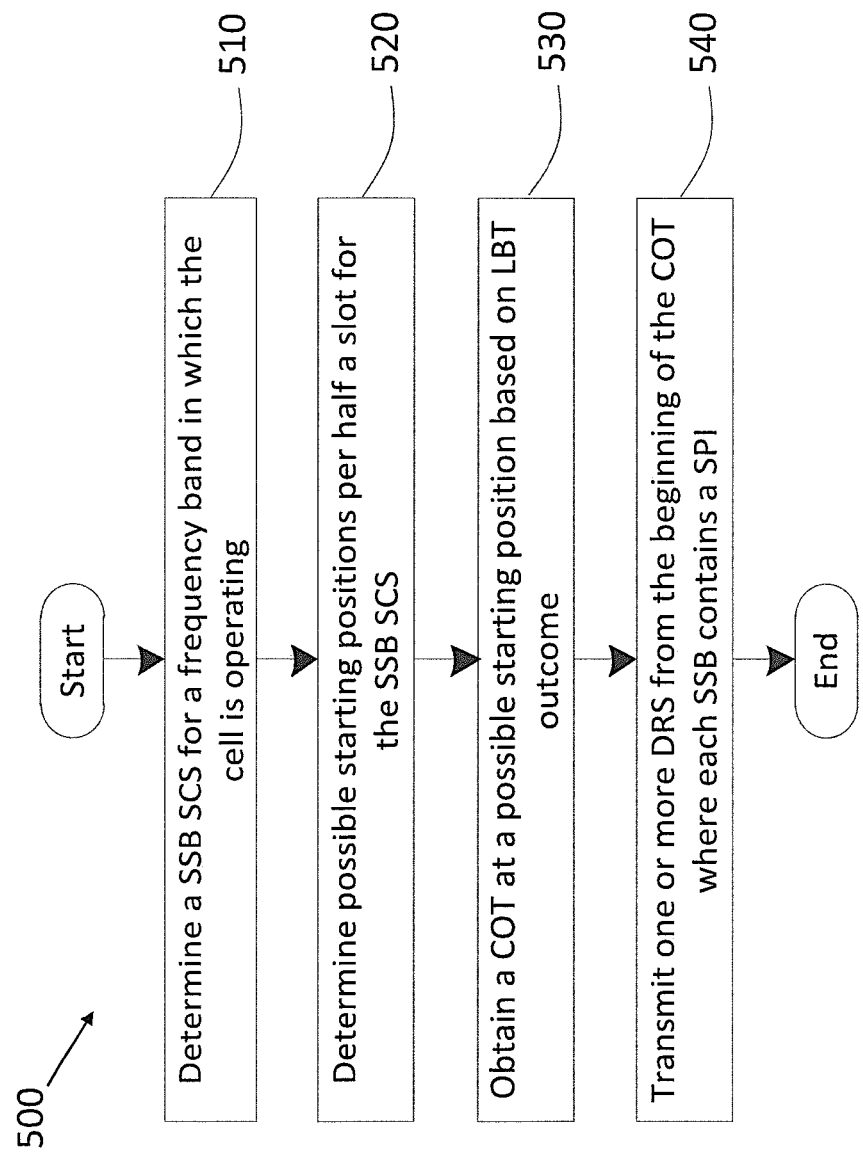
FIG. 5 shows a method of DRS transmission from a base station in accordance with the second example embodiment.

FIG. 5 shows a method 500 of DRS transmission from a base station in accordance with the second example embodiment. At step 510, the base station determines a SSB SCS for a frequency band in which the cell is operating. At step 520, the base station determines possible starting positions per half a slot for the SSB SCS. At step 530 the base station obtains a COT at a possible starting position based on LBT outcome. The possible starting position may not be aligned with half a slot boundary. At step 540 the base station transmits one or more DRS from the beginning of the COT where each SSB contains a SPI.

Figure 6:
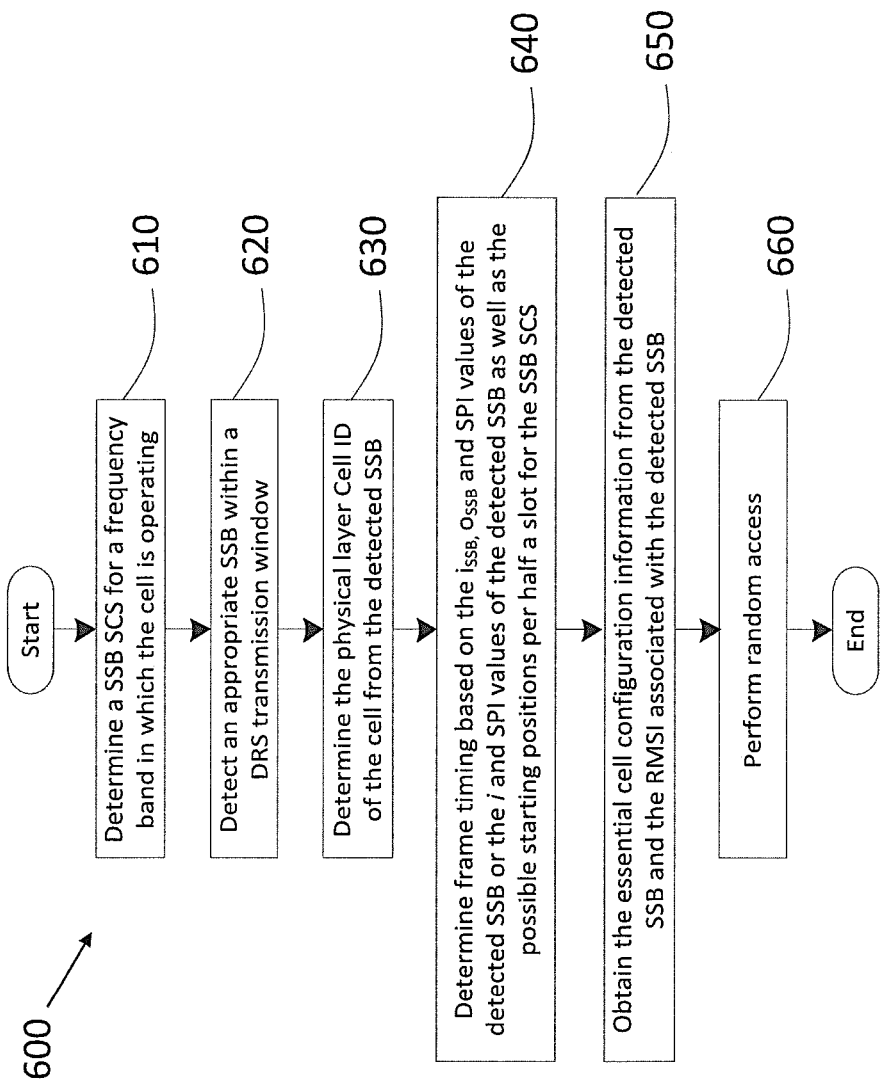
FIG. 6 shows a method of performing an initial access procedure by a terminal in accordance with the second example embodiment.

FIG. 6 is a method 600 for performing an initial access procedure by a terminal according to the second example embodiment. At step 610 the terminal determines a SSB SCS for a frequency band in which the cell is operating. At step 620 the terminal detects an appropriate SSB within a DRS transmission window. At step 630 the terminal determines the physical layer cell ID of the cell from the detected SSB. At step 640 the terminal determines frame timing based on the SSB index $i_{SSB}$, timing offset $O_{SSB}$, and SPI values of the detected SSB or the candidate SSB position index i and SPI values of the detected SSB as well as the possible starting positions per half a slot for the SSB SCS. At step 650 the terminal obtains the essential cell configuration information from the detected SSB and the RMSI associated with the detected SSB. At step 660 the terminal initiates a random access procedure with the base station.

Figure 7A:
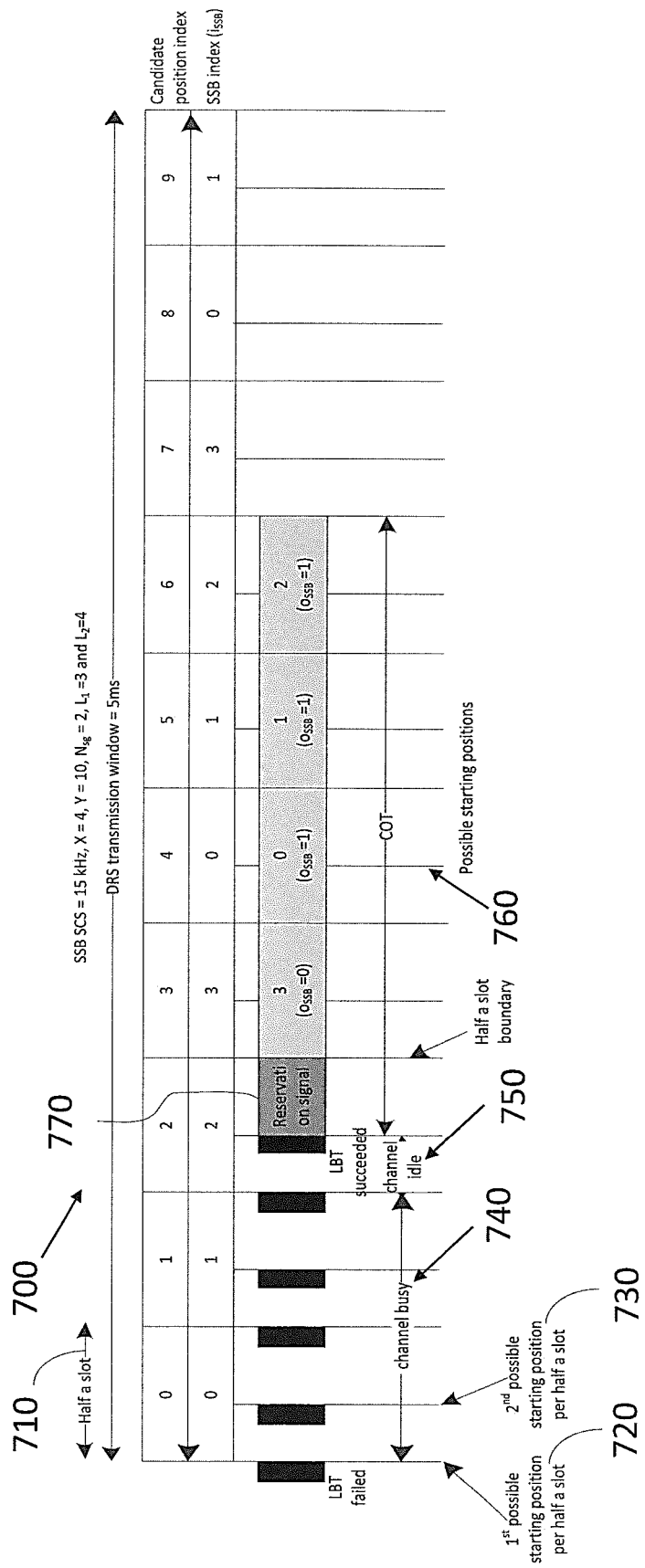
FIGS. 7A and 7B show a DRS transmission in accordance with a third example embodiment.
Figure 7B:
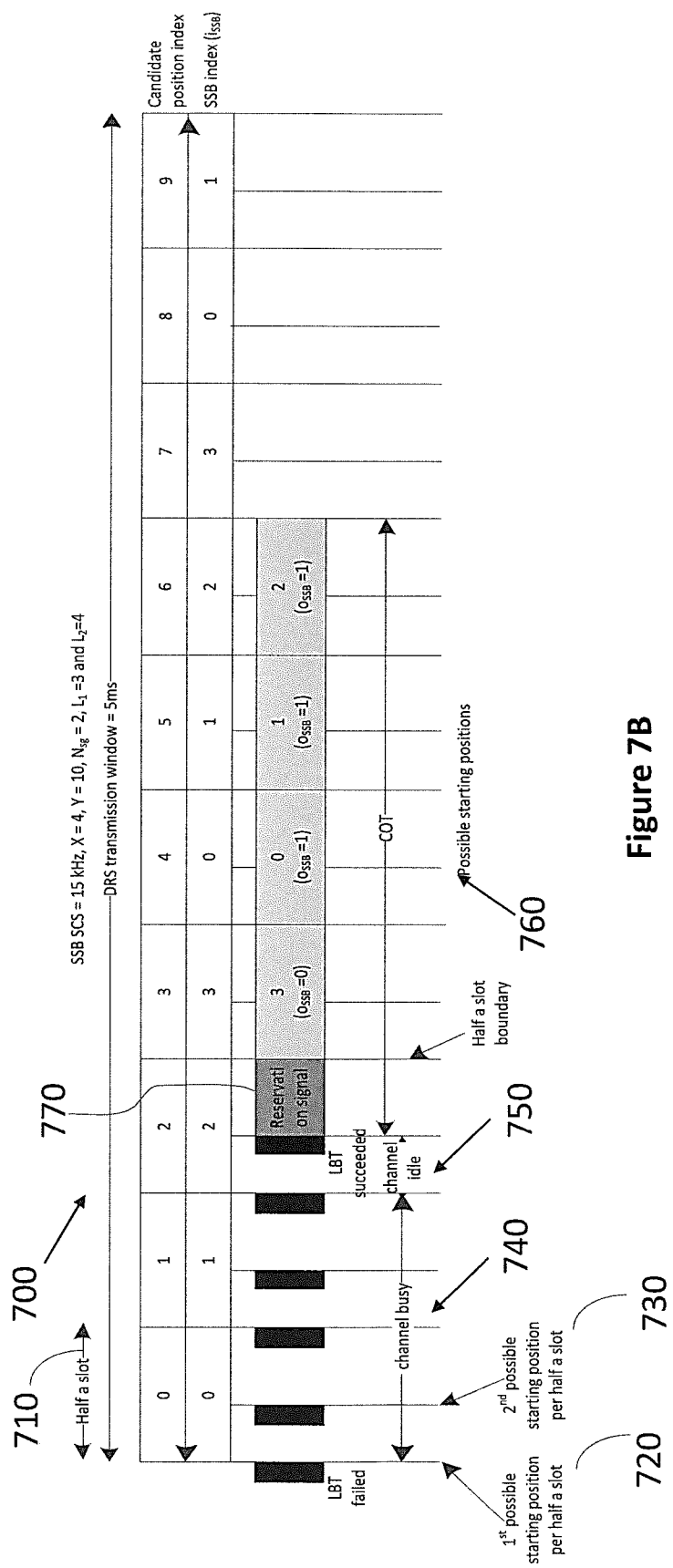

FIGS. 7A and 7B show a DRS transmission 700 in accordance with a third example embodiment. The DRS transmission 700 shows a plurality of possibly starting positions. Half a slots are shown along the candidate position index. In this example, DRS transmission window has a duration of 5 ms, SSB SCS=15 kHz, X=4, Y=10, $N_{sg}$=2, $L_1$=3, and $L_2$=4. The figures show the half a slot 710 with a first possible starting position 720 and a second possible starting position 730. The channel was busy at 740. LBT succeeded and the channel was idle at 750, and a COT obtained by a base station at a possible starting position that is not aligned with half a slot boundary is shown at 760. For FIG. 7A, the SSB index $i_{SSB}$ and the timing offset $O_{SSB}$ are indicated to the UEs in the corresponding SSB for help frame timing determination. FIG. 7A shows a SSB with $i_{SSB}$=3 and $O_{SSB}$=0 is transmitted at a candidate position with the candidate position index of 3, a SSB with $i_{SSB}$=0 and $O_{SSB}$=1 is transmitted at a candidate position with the candidate position index of 4, a SSB with $i_{SSB}$=1 and $O_{SSB}$=1 is transmitted at a candidate position with the candidate position index of 5, and a SSB with $i_{SSB}$=2 and $O_{SSB}$=1 is transmitted at a candidate position with the candidate position index of 6. For FIG. 7B, the candidate SSB position index i is indicated to the UEs in the corresponding SSB to help frame timing determination.

As shown in these figures, if a COT obtained by a base station is not aligned with half a slot boundary, the base station transmits a reservation signal 770 till next half a slot boundary before DRS transmission. Otherwise the base station just transmits one or more DRS from the beginning of the COT.

The reservation signal 770 is used to prevent other neighboring system from hijacking the COT. The conventional mechanism for determining frame timing can be reused. However, channel efficiency may be reduced due to the reservation signal transmission.

Figure 8:
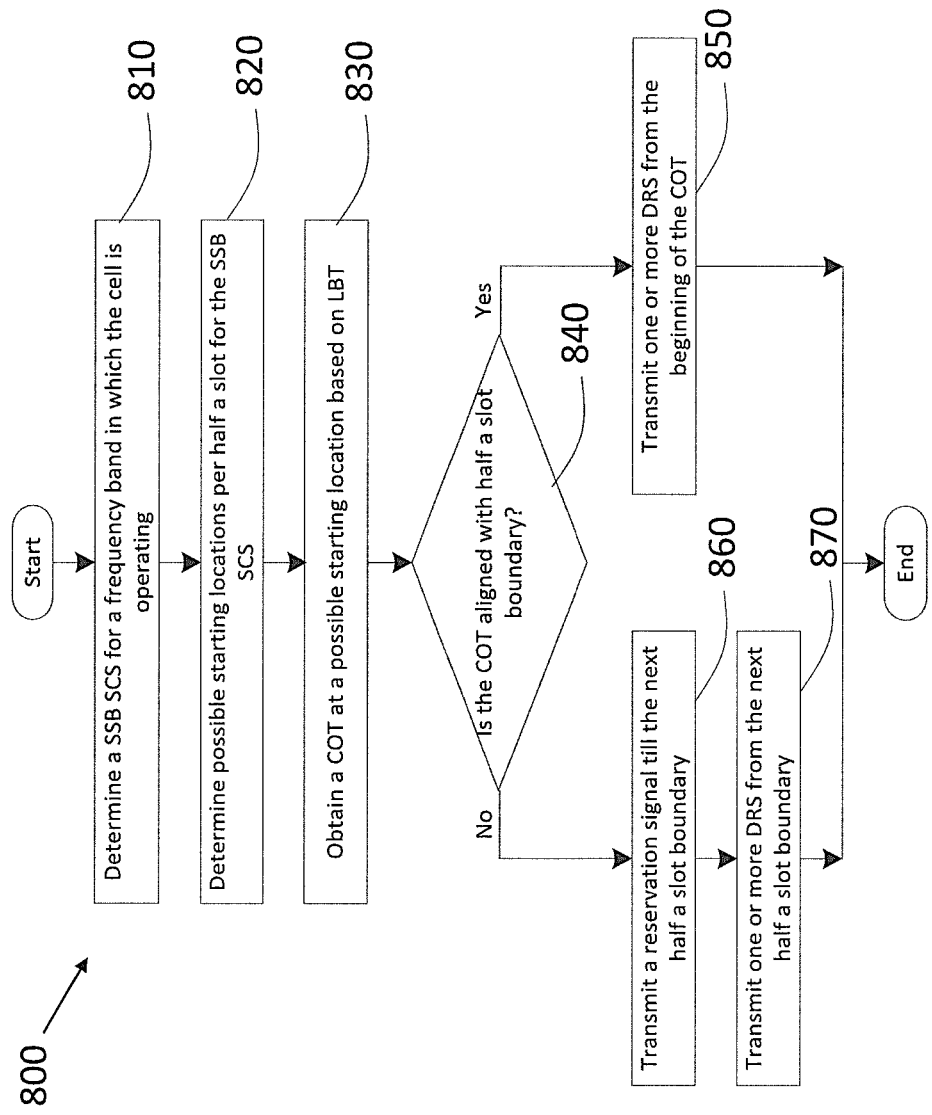
FIG. 8 shows a method of DRS transmission from a base station in accordance with the third example embodiment.

FIG. 8 shows a method 800 of DRS transmission from a base station according to the third example embodiment. At step 810 the base station determines a SSB SCS for a frequency band in which the cell is operating. At step 820 the base station determines possible starting positions per half a slot for the SSB SCS. At step 830 the base station obtains a COT at a possible starting position based on LBT outcome. At step 840 the base station makes a determination as to whether the COT is aligned with half a slot boundary. If the answer to this determination is "yes" flow proceeds to step 850 that transmits one or more DRS from the beginning of the COT. If the answer to this determination is "no" flow proceeds to step 860 that transmits a reservation signal till the next half a slot boundary. At step 870 the base station transmits one or more DRS from the next half a slot boundary.

Figure 9:
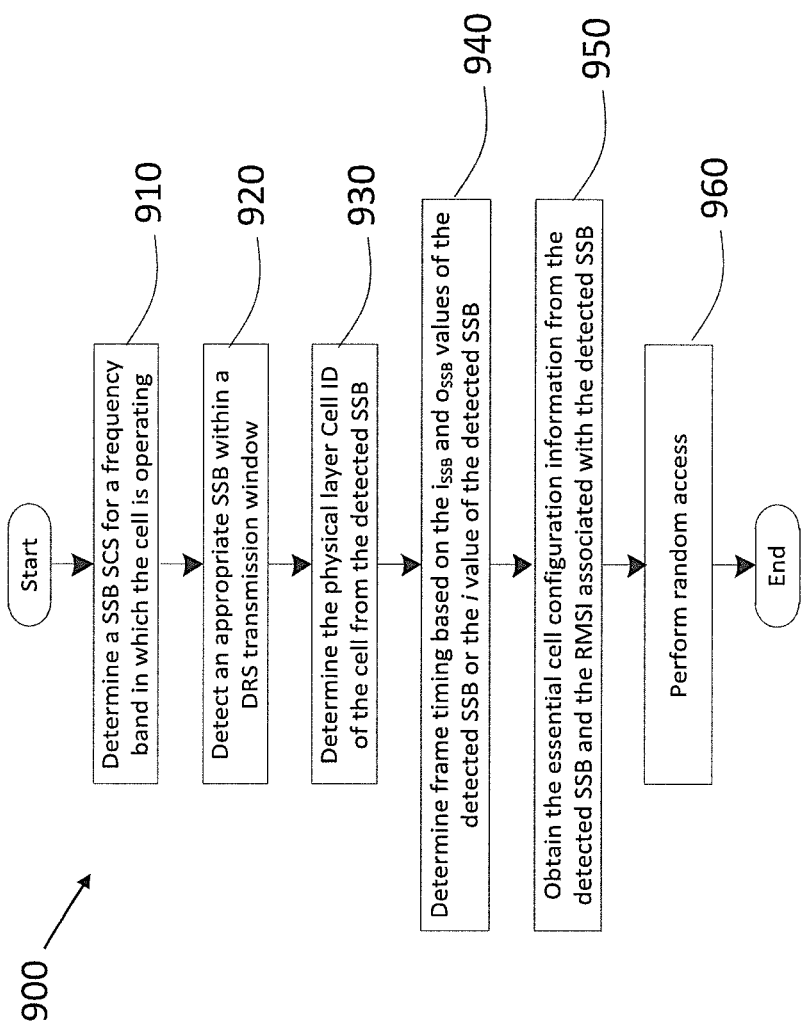
FIG. 9 shows a method of performing an initial access procedure in accordance with the third example embodiment.

FIG. 9 is a method 900 for performing an initial access procedure by a terminal according to the third example embodiment. At step 910 the terminal determines a SSB SCS for a frequency band in which the cell is operating. At step 920 the terminal detects an appropriate SSB within a DRS transmission window. At step 930 the terminal determines the physical layer cell ID of the cell from the detected SSB. At step 940 the terminal determines frame timing based on the SSB index ($i_{SSB}$) and timing offset ($O_{SSB}$) values of the detected SSB or the candidate SSB index (i) value of the detected SSB. At step 950 the terminal obtains the essential cell configuration information from the detected SSB and the RMSI associated with the detected SSB. At step 960 the terminal initiates a random access procedure with the base station.

Figure 10:
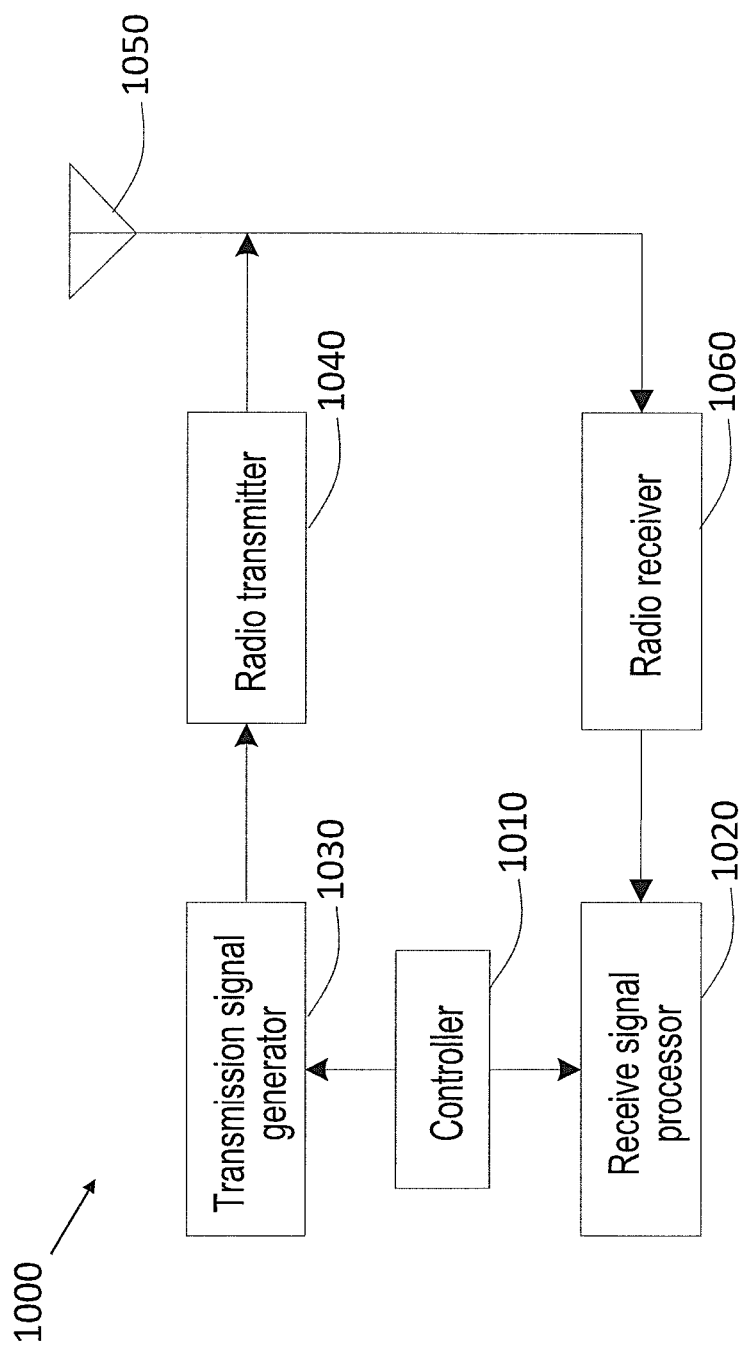
FIG. 10 shows an electronic device in accordance with an example embodiment.

FIG. 10 shows an electronic device 1000 in accordance with an example embodiment. The electronic device 1000 includes a controller 1010 coupled to or in communication with a receive signal processor 1020 and transmission signal generator 1030. The controller 1010, receive signal processor 1020, and transmission signal generator 1030 are collectively referred to as "circuitry." The circuitry has various functions, such as those discussed in connection with the controller, the receive signal processor, and the transmission signal generator discussed in FIGS. 11 and 12. The circuitry can also function to execute other example embodiments discussed herein. A radio transmitter 1040 couples to and/or communicates with the transmission signal generator 1030 and an antenna 1050. A radio receiver 1060 couples to and/or communicates with the receive signal processor 1020 and antenna 1050.

Consider an example embodiment in which the electronic device 1000 forms part of a base station (gNB). Transmission signal generator 1030 generates signals (e.g., DRS) under the control of the controller 1010. Radio transmitter 1040 transmits the generated transmission signals. Radio receiver 1060 receives signals (e.g., PRACH (physical random access channel)). Receive signal processor 1020 processes the received signals under the control of the controller.

Consider an example embodiment in which the electronic device 1000 forms part of a terminal (UE). Transmission signal generator 1030 generates signals (e.g., PRACH) under the control of the controller 1010. Radio transmitter 1040 transmits the generated transmission signals. Radio receiver 1060 receives signals (e.g., DRS). Receive signal processor 1020 processes the received signals under the control of the controller. For example, the radio receiver 1060 receives one or more DRS, which is transmitted by a base station within a COT starting at a possible starting position that is not aligned with half a slot boundary, and circuitry (e.g., controller 1010, receive signal processor 1020, and transmission signal generator 1030) that performs frame timing according to the received one or more DRS. Radio transmitter 1040 transmits signals from the terminal to the base station.

Figure 11:
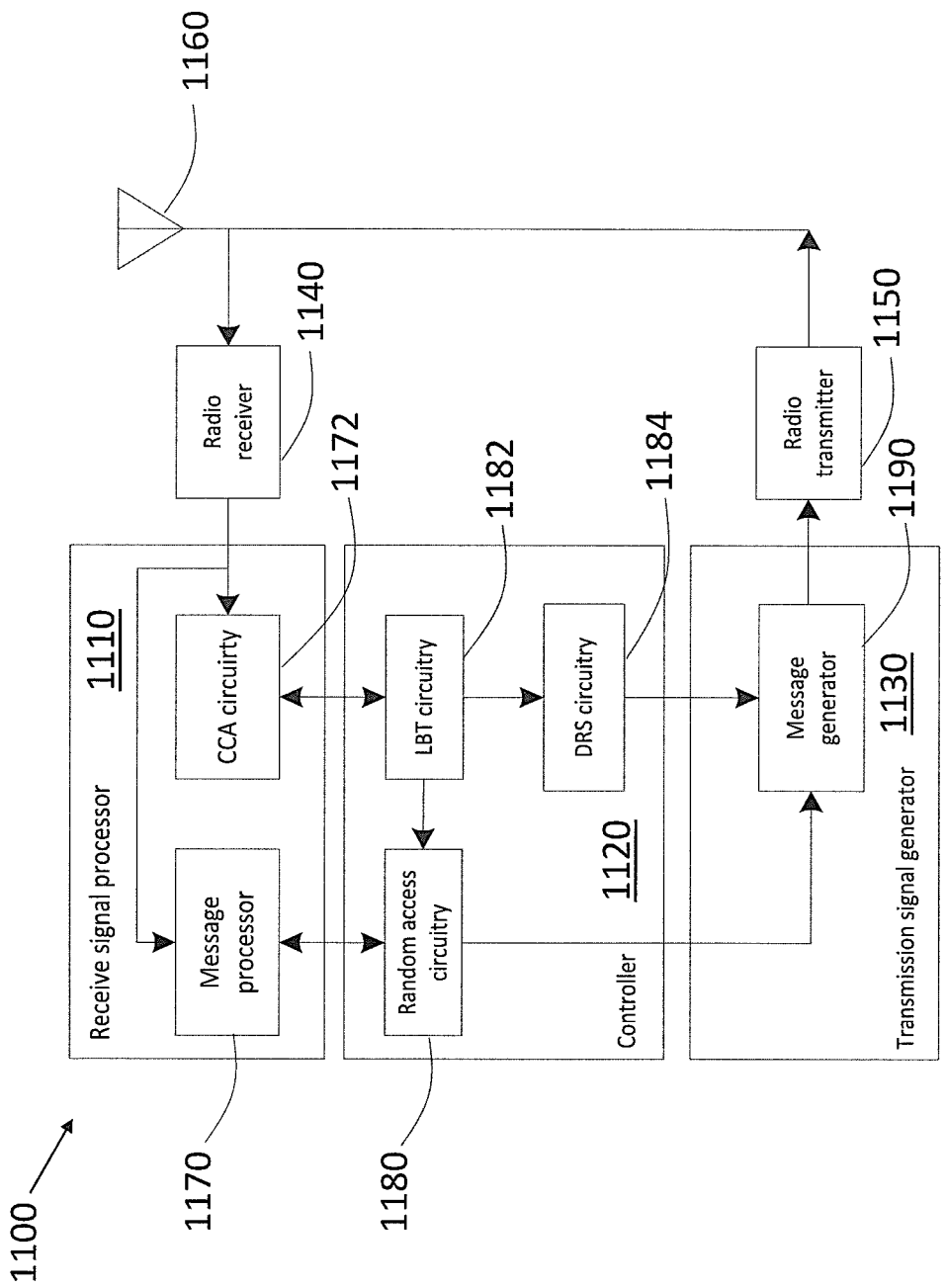
FIG. 11 shows another electronic device in accordance with an example embodiment.

FIG. 11 shows an electronic device 1100 in accordance with an example embodiment. The electronic device 1100 includes a receive signal processor 1110, a controller 1120, a transmission signal generator 1130, a radio receiver 1140, a radio transmitter 1150, and an antenna 1160. The receive signal processor 1110 further includes a message processor 1170 and CCA circuitry 1172. The controller 1120 further includes random access circuity 1180, LBT circuitry 1182, and DRS circuitry 1184. The transmission signal generator 1130 includes a message generator 1190.

Consider an example embodiment in which the electronic device 1100 is a base station (gNB). The message processor 1170 processes the received messages (e.g., Msg1/Msg3 in the 4-step random access procedure). The CCA circuity 1172 performs clear channel assessment (CCA). The random access circuitry 1180 controls random access related operation. For example, it controls the transmission of Msg2 based on the reception of Msg1 and the LBT outcome. The LBT circuitry 1182 determines CCA timing and channel availability based on CCA results. The DRS circuitry 1184 controls the transmission of DRS and reservation signal based on LBT outcome. The message generator 1190 generates the transmission signals (e.g., DRS, reservation signal, Msg2 or Msg4 in the 4-step random access procedure).

Figure 12:
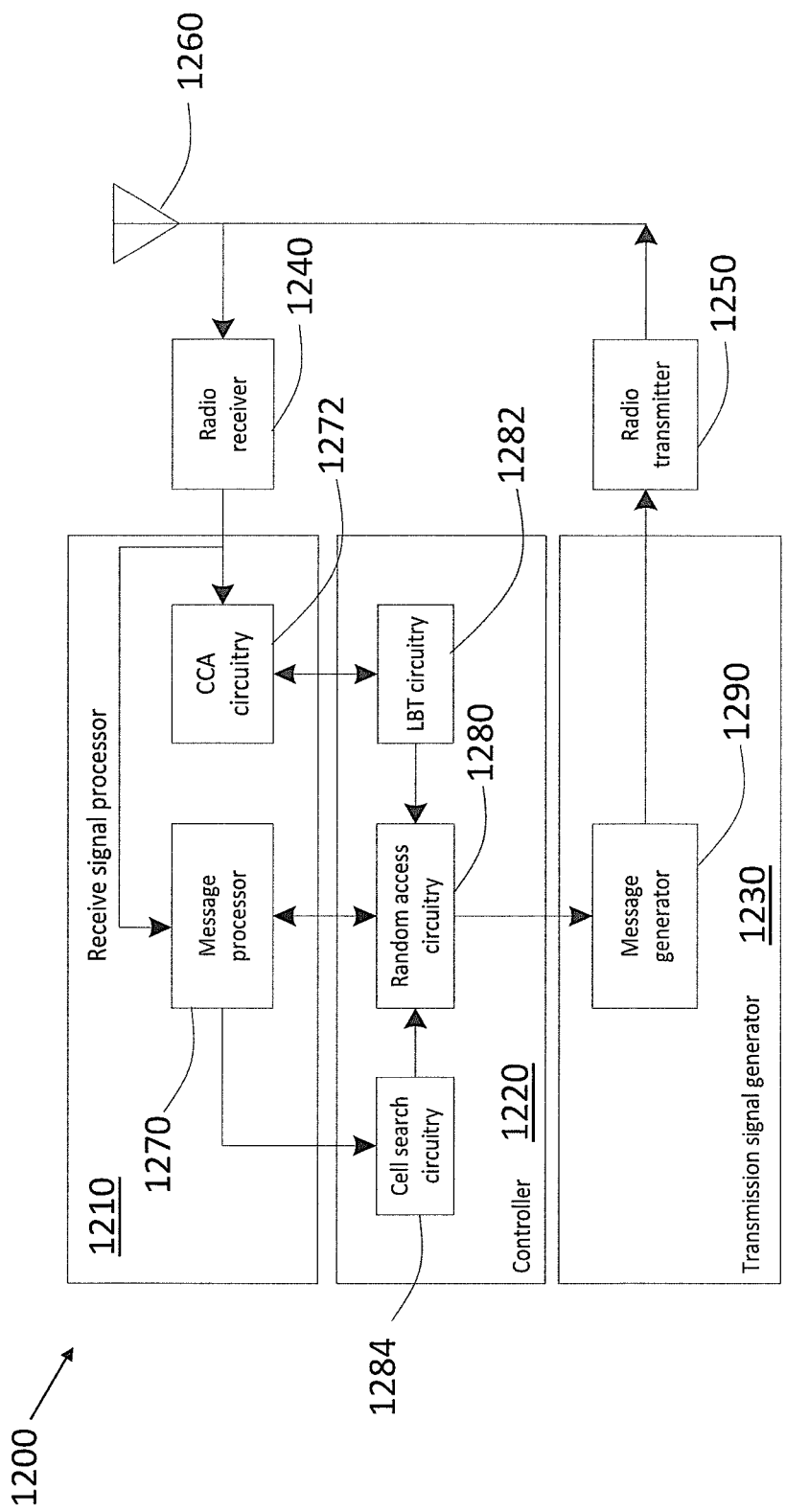
FIG. 12 shows another electronic device in accordance with an example embodiment.

FIG. 12 shows an electronic device 1200 in accordance with an example embodiment. The electronic device 1200 includes a receive signal processor 1210, a controller 1220, a transmission signal generator 1230, a radio receiver 1240, a radio transmitter 1250, and an antenna 1260. The receive signal processor 1210 further includes a message processor 1270 and CCA circuitry 1272. The controller 1220 further includes random access circuity 1280, LBT circuitry 1282, and cell search circuitry 1284. The transmission signal generator 1230 includes a message generator 1290.

Consider an example embodiment in which the electronic device 1200 is a terminal (UE). The message processor 1270 processes the received signals (e.g., DRS, Msg2 or Msg4 in the 4-step random access procedure). The CCA circuity 1272 performs clear channel assessment (CCA). The random access circuitry 1280 controls random access related operation. For example, it controls the transmission of Msg3 based on the reception of Msg2 and the LBT outcome. The LBT circuitry 1282 determines CCA timing and channel availability based on CCA results. The cell search circuitry 1284 determines frame timing, captures system information and essential cell configuration information based on the received DRS. The Message generator 1290 generates the transmission signals (e.g., Msg1 or Msg3 in the 4-step random access procedure).

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

One example embodiment is a terminal that includes a receiver, which in operation, receives one or more discovery reference signal (DRS) transmitted by a base station within a channel occupancy time (COT) starting at a possible starting position that is not aligned with half a slot boundary; and circuitry, which in operation, determines frame timing in response to receiving the one or more DRS.

In the terminal, more than one possible starting positions per half a slot are determined for a subcarrier spacing (SCS).

In the terminal, the number of possible starting positions per half a slot varies for different SCSs.

In the terminal, the number of possible starting positions per half a slot for a smaller SCS is greater than that for a larger SCS.

In the terminal, each of the one or more DRS includes a first signaling for indicating a synchronization signal block (SSB) index and a second signaling for indicating a timing offset.

In the terminal, each of the one or more DRS includes a signaling for indicating a candidate SSB position index.

In the terminal, each of the one or more DRS includes a signaling for indicating a starting position index (SPI).

In the terminal, a time domain position of the one or more DRS is selected from one or more additional candidate positions corresponding to the possible starting position.

In the terminal, a starting index for the one or more additional candidate positions corresponding to the possible starting position is an integer multiple of X, where X is a maximum number of the one or more DRS transmitted within a DRS transmission window.

Another example embodiment is a base station that includes circuitry, which in operation, generates one or more discovery reference signal (DRS); and a transmitter, which in operation, transmits the one or more DRS to a terminal within a channel occupancy time (COT) starting at a possible starting position that is not aligned with half a slot boundary.

In the base station, the number of possible starting positions per half a slot for a smaller SSB subcarrier spacing (SCS) is greater than that for a larger SSB SCS.

In the base station, the transmitter transmits a reservation signal till a next half a slot boundary prior to the transmission of the one or more DRS.

Another example embodiment is a communication method. The method includes obtaining, at a base station, a channel occupancy time (COT) starting at a possible starting position that is not aligned with half a slot boundary; generating, at the base station, one or more discovery reference signal (DRS) at a beginning of the COT; and transmitting, from the base station, the one or more DRS to a terminal within the COT.

The method further includes receiving, at a terminal, the one or more DRS transmitted by the base station; and determining, at the terminal, frame timing in response to receiving the one or more DRS.

The method further includes selecting a time domain position of the one or more DRS from one or more additional candidate positions.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the disclosure in any way. Rather, the foregoing detailed description will provide those skilled in the art with a convenient road map for implementing exemplary embodiments of the disclosure, it being understood that various changes may be made in the function and arrangement of steps and method of operation described in the exemplary embodiments without departing from the scope of the disclosure as set forth in the appended claims.

What is claimed is:

1. A terminal comprising:
    a receiver, which in operation, receives one or more discovery reference signals (DRSs) transmitted by a base station within a channel occupancy time (COT) starting at a possible start timing that is not aligned with half a slot boundary and that is determined from one or more possible start timings; and
    circuitry, which in operation, determines frame timing in response to receiving the one or more DRSs,
    wherein a number of the one or more possible start timings per half a slot is different for different subcarrier spacings (SCSs).

2. The terminal of claim 1, wherein more than one possible start timing per half a slot are determined for a subcarrier spacing (SCS).

3. The terminal of claim 1, wherein the number of possible start timings per half a slot for a smaller SCS is greater than that for a larger SCS.

4. The terminal of claim 1, wherein each of the one or more DRSs include a first signaling for indicating a synchronization signal block (SSB) index and a second signaling for indicating a timing offset.

5. The terminal of claim 1, wherein each of the one or more DRSs include a signaling for indicating a candidate SSB position index.

6. The terminal of claim 1, wherein each of the one or more DRSs include a signaling for indicating a starting position index (SPI).

7. The terminal of claim 1, wherein a time domain position of the one or more DRSs is selected from one or more additional candidate positions corresponding to the possible start timing.

8. The terminal of claim 7, wherein a starting index for the one or more additional candidate positions corresponding to the possible start timing is an integer multiple of X, where X is a maximum number of the one or more DRSs transmitted within a DRS transmission window.

9. A base station, comprising:
    circuitry, which in operation, generates one or more discovery reference signal signals (DRSs); and
    a transmitter, which in operation, transmits the one or more (DRSs) to a terminal within a channel occupancy time (COT) starting at a possible start timing that is not aligned with half a slot boundary and that is determined from one or more possible start timings,
    wherein a number of the one or more possible start timing per half a slot is different for different subcarrier spacings (SCSs).

10. The base station of claim 9, wherein the number of possible start timings per half a slot for a smaller synchronization signal block (SSB) subcarrier spacing (SCS) is greater than that for a larger SSB SCS.

11. The base station of claim 9, wherein the transmitter transmits a reservation signal till a next half a slot boundary prior to the transmission of the one or more DRSs.

12. A communication method comprising:
    obtaining, at a base station, a channel occupancy time (COT) starting at a possible start timing that is not aligned with half a slot boundary and that is determined from one or more possible start timings;
    generating, at the base station, one or more discovery reference signals (DRSs) at a beginning of the COT; and
    transmitting, from the base station, the one or more DRSs to a terminal,
    wherein a number of the one or more possible start timing per half a slot is different for different subcarrier spacings (SCSs).

13. The communication method according to claim 12, comprising:
    receiving, at a terminal, the one or more DRSs transmitted by the base station; and
    determining, at the terminal, frame timing in response to receiving the one or more DRSs.

14. The communication method according to claim 12, comprising:
    selecting, at the base station, a time domain position of the one or more DRSs from one or more additional candidate positions corresponding to the possible start timing.

* * * * *